Feb. 19, 1957 R. S. HOOD 2,782,118
PRODUCTION OF REFRACTORY METALS
Filed Feb. 19, 1952 2 Sheets-Sheet 1

INVENTOR.
RALPH S. HOOD.
BY

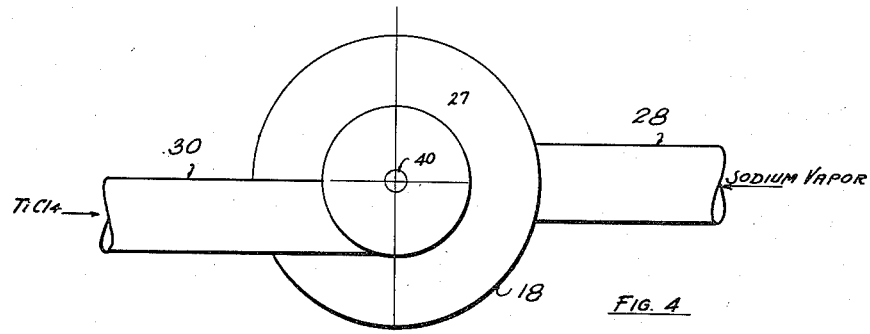
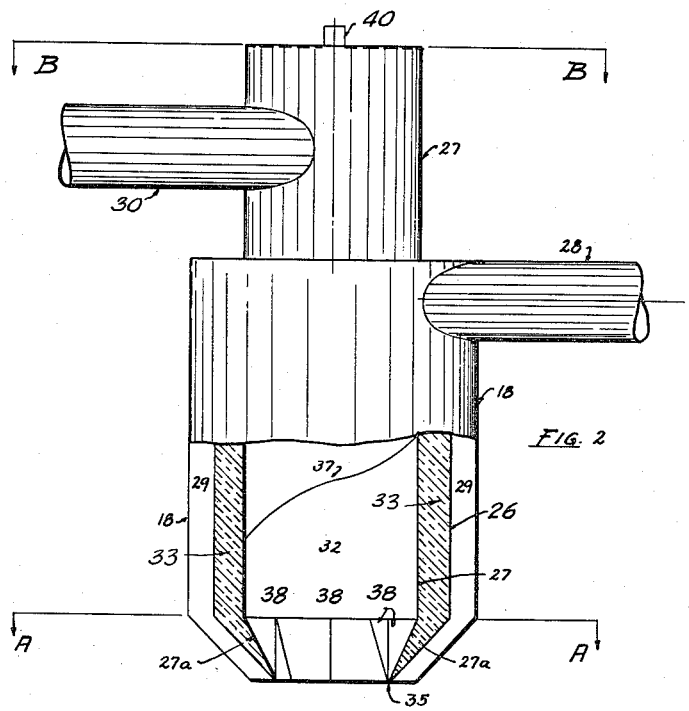
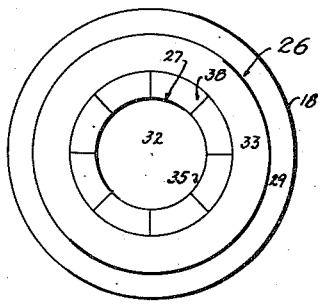

United States Patent Office 2,782,118
Patented Feb. 19, 1957

2,782,118

PRODUCTION OF REFRACTORY METALS

Ralph S. Hood, Marblehead, Mass., assignor to Monsanto Chemical Company, St. Louis, Mo., a corporation of Delaware Application February 19, 1952, Serial No. 272,379

6 Claims. (Cl. 75—84.5)

This invention relates to the production of group IVa metals and more particularly to the production of such metals in a high state of purity.

The principal object of the present invention is the provision of an improved process whereby the production of group IVa metals may be efficiently and cheaply carried out. Another object is to provide an apparatus suitable for carrying out the present invention.

The present invention relates to and is an improvement upon the invention described and claimed in Findlay application Serial No. 200,606, filed December 13, 1950. According to the Findlay invention a group IVa tetrahalide in the vapor form is reacted with the vapor of a reducing metal, for example, a metal of the alkali or of the alkaline earth group metals: sodium and magnesium. In the practice of the Findlay invention group IVa metals are produced from the corresponding halides and preferably the chlorides by mixing said vaporous halides with the vapor of the reducing metal, the reaction being characterized by an extremely high temperature. In the Findlay invention the metal may be recovered in the form of a solid ingot, if desired, which is substantially free of the by-product reducing metal halides formed in the process by reason of the fact that said by-product halides are formed in the vapor state.

I have discovered that when said Findlay process is carried out that there is a tendency, probably caused by backdrafts or convection currents, for the molten metal particles to form metallic accretions upon adjacent metal surfaces and in particular upon that portion of the nozzle which is adjacent to the point where the vapor streams are first intermixed. Such accretions cause the reaction flame to be deflected from its desired course so that it no longer impinges directly upon the ingot-collecting surface.

I have now found that by interposing liquid droplets of either said metal halide or said reducing metal between the said streams of reacting vapors that the mixing of the vapors is retarded, with the result that accretions are no longer formed and the flame is not deflected from its desired direction, with the result that a good collection of metal upon the ingot surface is realized. Liquid droplets of said metal halide or said reducing metal are most conveniently formed at the junction of the two streams of reactants by supplying said reactant vapor in the form of a mist and then subjecting said mist to centrifugal action in such a manner that the liquid particles therein are caused to impinge upon and wet the surface adjacent the junction of the two streams.

Apparatus suitable for mixing reacting streams of metal halide vapor and reducing metal vapor in such a manner as to interpose droplets of a liquid reactant forms part of my present invention. Such apparatus comprises a nozzle consisting of two concentric vapor ports, the inner port being provided with means for imparting a circular motion to the reactant containing liquid droplets, the outer port being arranged to supply the other reactant in vapor form, there being provided between said inner and said outer ports an insulated annular space terminating in an edge which is adjacent the point of mixing of said reacting vapor streams. The liquid reactant contained in said mist is caused by the centrifugal force imparted to the vapor stream to form droplets upon said terminal edge. In this manner droplets of the reactant are interposed at the junction of said reacting streams and momentarily retard the mixing thereof with the result that accretions are no longer formed.

The invention is further illustrated by the following description when read in connection with the accompanying drawings in which Fig. 1 is a view partly in section of the apparatus employed for practicing the present invention.

Fig. 2 is an enlarged view also partly in section of the burner nozzle forming part of the apparatus of this invention.

Fig. 3 is a section taken along the line A—A of Fig. 2.

Fig. 4 is a further section taken along the line B—B of Fig. 2.

In the drawings, like numerals indicate like elements.

Figure 1:
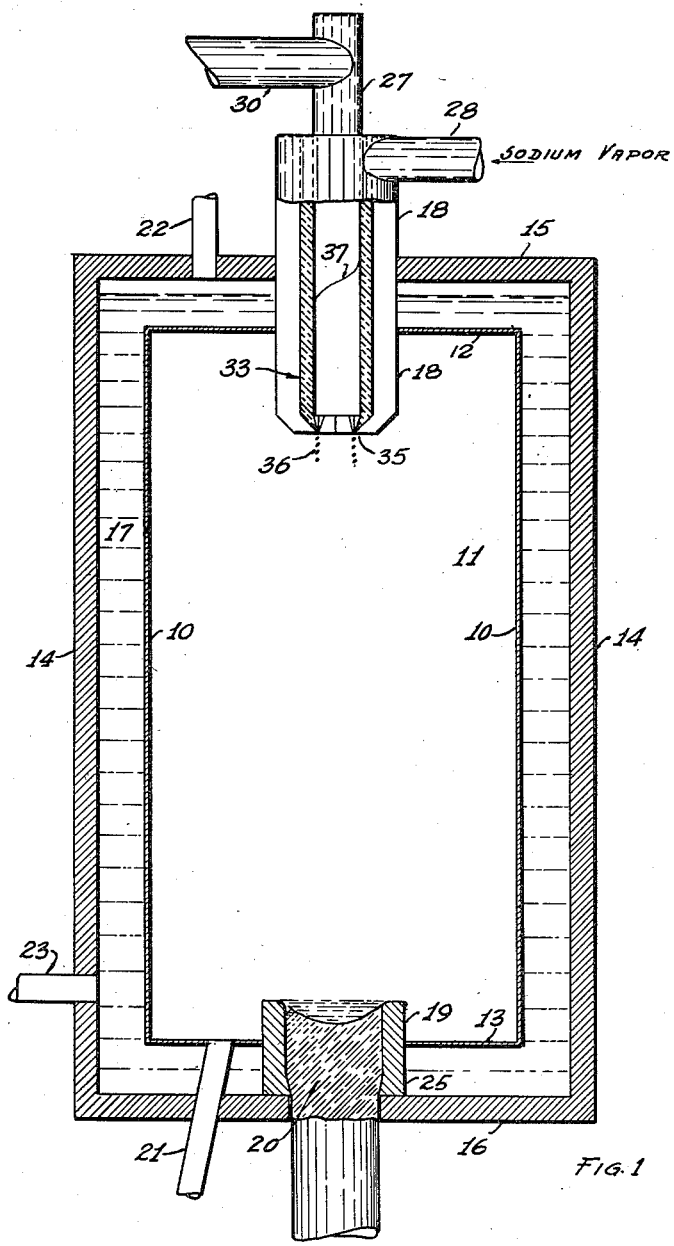

Returning to Fig. 1, numeral 10 indicates a cylindrical shell defining a reaction space 11, said shell being provided with covers or plates 12 and 13 affixed to the upper and lower ends, respectively.

Surrounding shell 10 is a second shell 14, likewise provided with upper and lower plates 15 and 16, respectively. The annular space 17 between the shells is filled with a liquid heat transfer medium such as sodium or magnesium metal, the purpose of which will be described below.

The top plate 15 is provided with an outlet pipe 22 and a nozzle 18 extending through plate 12 and into the reaction zone. Bottom 13 is provided with an ingot mold 19, which is affixed thereto and also affixed to bottom plate 16. Within the mold is located an ingot 20 of the refractory metal produced by the process. Pipe 21, attached to 13 and passing through 16, provides a means for removal of by-product salt.

Pipe 22 serves as an exit for heat transfer fluid which fluid may be introduced into space 17 by means of pipe 23. Such heat transfer fluid may be a liquid which is vaporized at the operating temperature of the reactor or it may remain as a liquid, in which event it is withdrawn from the space 17, passed through a cooler and reintroduced into the space 17. In any event, heated liquid or vapor is withdrawn through pipe 22, cooled or condensed and reintroduced by means of pipe 23, in this manner removing heat from the wall 10 surrounding the reaction space 11. The fluid also surrounds a portion of mold wall 25, whereby the mold is cooled to below the melting point of the refractory metal 20, and thus permits a solid ingot to be formed and withdrawn.

The construction of nozzle 18 is further illustrated in Figs. 2, 3 and 4.

The nozzle consists of an outer shell 18, a second internal shell 26 and a third internal shell 27. Pipe 28 connects with the annular space 29 defined by shells 26 and 18, while pipe 30 connects with the internal space 32 defined by shell 27. The annular space 33 defined by the shells 26 and 27 may be a "dead air" space, filled with insulating material, the purpose of which is to provide a heat insulating barrier between space 29 and space 32. The reason for this barrier will be later described. By drawing shells 26 and 27 together at the lower single edge 35, vapors passing through the respective ports are caused to intermingle adjacent said edge 35.

Pipe 30 is joined to shell 27 in an offset manner, the purpose of this arrangement being to impart a whirling motion to gases or vapors entering shell 27. Such whirling motion may be aided by spiral vanes 37 affixed to the interior of shell 27. The purpose of the whirling motion is to impart centrifugal force to liquid particles present in the vapor of this substance.

Shell 27 terminates in a slightly conical section 27a, within which are a number of axially arranged baffles 38.

The operation of the nozzle and the reactor in the preferred manner will now be described.

Sodium vapors produced by a sodium vaporizer, which is not shown, enter pipe 28 and pass downwardly into space 29 and thence out at and adjacent to edge 35. Titanium tetrachloride vapors and liquid particles (mist) produced by a vaporizer, not shown, simultaneously enter pipe 30 and then pipe 27, wherein by reason of the offset arrangement have imparted thereto a whirling motion. By means of baffle 37 and the velocity of the gases, the whirling motion is amplified. Mist particles being heavier than the vapor are caused to impinge upon the interior surface of shell 27 and to wet the same with a liquid film. Such liquid film, upon further downward flow, strikes baffles 38 which impede the circular motion and cause the liquid to form droplets 36 on edge 35.

At this point it may be explained that the reaction between titanium tetrachloride and sodium vapor results in the formation of titanium metal and sodium chloride as described in said Findlay application. The reaction is characterized by the evolution of large quantities of heat, with the result that the temperature of the reacting gases or "flame" attains a temperature in the neighborhood of 2000° C. This temperature is above the melting point of titanium metal with the result that molten particles of the metal are propelled by the flame upon the surface of ingot 20, forming a layer of molten metal thereon. Such a layer becomes solidified, causing the ingot to increase in length, as already described.

While the flame intensity is advantageously utilized in the deposition of molten metal on the ingot surface, the presence of such molten metal particles with the inevitable presence of backdrafts and convection currents results in the formation of metallic accretions upon the metal surfaces adjacent the point of mixing of the vapors, with the result that the flame is deflected from its normal course and no longer impinges directly upon the ingot surface. Such metallic accretions adhere to edge 35, shown in Figs. 1, 2 and 3 and result in serious disturbance of the flame direction. I have now found that by introducing along with the vaporized titanium tetrachloride a proportion of liquid particles of said tetrachloride that the reaction of said tetrachloride with sodium vapor is sufficiently retarded so that it takes place at a distance from the point where the vapors intermingle. In Fig. 1 I have shown the effect in somewhat exaggerated form, wherein, by means of numeral 36, is indicated a series of droplets of liquid titanium tetrachloride which have formed on the metal edge 35.

The amount of liquid particles or of mist present, that is, the "quality" of the titanium tetrachloride is subject to wide variation, depending as it does upon the velocity of the vapors issuing from the nozzle and the presence of backdrafts or convection currents existing in the gases at the nozzle orifice. The amount of such liquid titanium tetrachloride necessary to achieve the effect desired can best be judged by observing the behavior of the flame by means of visual observations through a peephole arranged as at 40 in Figs. 2 and 4.

In the above description the invention has been described as adapted to the embodiment wherein the liquid droplets are contained in the group IVa metal halide. It is, of course, also applicable to the utilization of liquid droplets which are contained in the reducing metal vapor by appropriate change in the procedure described above.

The effect of such liquid droplets at the junction where the two vapors are intermixed is not well understood. However, I believe that the length of time necessary to evaporate the droplets (although extremely short in actual time units) prevents premature reaction close to the tip 35, thus preventing the formation of accretions.

By reason of the substantial difference in the boiling points of the group IVa halide and the reducing metal, it will be seen that the vapor temperatures of these substances are extremely wide apart. For example, in regard to the embodiment herein being considered, the boiling point of the titanium tetrachloride at atmospheric pressure is 136.4° C., while the boiling point of sodium is 880° C. It is, therefore, desirable to separate by suitable heat insulation the conduit conveying the former from the conduit conveying the latter. This is the function of the annular space 33, referred to above, and which space may be sealed with an effective thermal insulating material such as silica aerogel or finely divided carbon.

Having thus described my invention, what I claim is:

1. In a process for producing a group IVa metal selected from the group consisting of titanium and zirconium wherein a directed moving vapor stream of a halide of said group IVa metal is mixed with a directed moving vapor stream of a reducing metal selected from the group consisting of sodium and magnesium, the step of interposing a liquid film of one of the foregoing reactants between said moving streams at a point at which said streams would otherwise contact each other, thereby delaying reaction between said vapors until they have moved past said point.

2. In a process for producing a group IVa metal selected from the group consisting of titanium and zirconium wherein a directed moving vapor stream of a halide of said group IVa metal is mixed with a directed moving vapor stream of a reducing metal selected from the group consisting of sodium and magnesium, the step of interposing a liquid film of said metal halide between said moving streams at a point at which said streams would otherwise contact each other, thereby delaying reaction between said vapors until they have moved past said point.

3. In a process for producing a group IVa metal selected from the group consisting of titanium and zirconium by the exothermic vapor-phase reaction between a vaporous halide of said group IVa metal and a vaporous reducing metal selected from the group consisting of sodium and magnesium whereby the aforesaid reactants are separately introduced as vapor streams through conduits into a reaction zone and intermixed under conditions such that said group IVa metal in condensed form tends to deposit on the terminal portions of at least one of said conduits, the improvement which comprises supplying a portion of at least one of said reactants in condensed liquid form disposed along the boundary between said streams as they leave the terminal portions of said conduits, thereby delaying reaction between said vapors until they have reached a point removed from said terminal portion of said conduit.

4. In a process for producing a group IVa metal selected from the group consisting of titanium and zirconium by the exothermic vapor-phase reaction between a vaporous halide of said group IVa metal and a vaporous reducing metal selected from the group consisting of sodium and magnesium whereby the aforesaid reactants are separately introduced as vapor streams through conduits into a reaction zone and intermixed under conditions such that said group IVa metal in condensed form tends to deposit on the terminal portions of at least one of said conduits, the improvement which comprises forming an annular stream of said vaporous reducing metal and forming coaxially within said annular stream but separated therefrom a stream of vaporous halide of said group IVa metal containing suspended therein condensed liquid particles of said halide, subjecting said vaporous halide stream to a centrifugal force whereby said condensed liquid particles of said halide are concentrated and agglomerated about the outer boundary of said halide vapor stream as it leaves the terminal portion of said conduit, thereby delaying reaction between said vapors until they have reached a point removed from said terminal portion of said conduit.

5. The process of claim 1 wherein the group IVa metal is titanium, the group IVa metal halide is titanium tetrachloride and the reducing metal is sodium.

6. The process of claim 4 wherein the group IVa metal is titanium, the group IVa metal halide is titanium tetrachloride and the reducing metal is sodium.

References Cited in the file of this patent

UNITED STATES PATENTS

| | | |
|---|---|---|
| 391,865 | Schutte | Oct. 30, 1888 |
| 1,306,568 | Weintraub | June 10, 1919 |
| 1,328,225 | Boyle | Jan. 13, 1920 |
| 1,369,602 | Amsler | Feb. 22, 1921 |
| 1,536,176 | Aldrich | May 5, 1925 |
| 1,738,199 | Peabody | Dec. 3, 1929 |
| 2,091,087 | Wempe | Aug. 24, 1937 |
| 2,148,345 | Freudenberg | Feb. 21, 1939 |
| 2,205,854 | Kroll | June 25, 1940 |
| 2,556,763 | Maddex | June 12, 1951 |
| 2,565,039 | Mueller | Aug. 21, 1951 |
| 2,618,549 | Glasser et al. | Nov. 18, 1952 |
| 2,621,121 | Winter | Dec. 9, 1952 |
| 2,647,826 | Jordan | Aug. 4, 1953 |

FOREIGN PATENTS

| | | |
|---|---|---|
| 253,161 | Great Britain | June 7, 1926 |
| 642,500 | Great Britain | Sept. 6, 1950 |

OTHER REFERENCES

Handbook, of Chemistry and Physics, 28th ed., pub. 1944 by Chemical Rubber Publishing Co., Cleveland, Ohio. Pages 480, 481, 454 and 455.

Journal of Metals, April 1950, pages 634–640, incl.